United States Patent
Blokhin et al.

(10) Patent No.: US 11,196,685 B2
(45) Date of Patent: Dec. 7, 2021

(54) METHOD, SYSTEM AND APPARATUS FOR CENTRALIZED AUGMENTATION OF AUTONOMOUS MESSAGE HANDLING

(71) Applicant: KIK INTERACTIVE INC., Waterloo (CA)

(72) Inventors: Yuriy Blokhin, Vancouver (CA); Kevin Burton, Woodstock (CA)

(73) Assignee: KIK INTERACTIVE INC., Waterloo (CA)

( * ) Notice: Subject to any disclaimer, the term of this patent is extended or adjusted under 35 U.S.C. 154(b) by 133 days.

(21) Appl. No.: 15/474,438

(22) Filed: Mar. 30, 2017

(65) Prior Publication Data

US 2018/0145935 A1 May 24, 2018

Related U.S. Application Data

(60) Provisional application No. 62/425,252, filed on Nov. 22, 2016.

(51) Int. Cl.
*G06F 15/173* (2006.01)
*H04L 12/58* (2006.01)
*G06F 15/16* (2006.01)

(52) U.S. Cl.
CPC ............ *H04L 51/02* (2013.01); *H04L 51/046* (2013.01)

(58) Field of Classification Search
CPC .............................. H04L 51/02; H04L 51/046
USPC .................................................. 709/207, 217
See application file for complete search history.

(56) References Cited

U.S. PATENT DOCUMENTS

| | | | |
|---|---|---|---|
| 9,450,901 B1* | 9/2016 | Smullen | H04L 51/046 |
| 2012/0041903 A1* | 2/2012 | Beilby | G06N 3/004 |
| | | | 706/11 |
| 2014/0280623 A1* | 9/2014 | Duan | H04L 51/02 |
| | | | 709/206 |
| 2016/0255139 A1* | 9/2016 | Rathod | G06F 16/9535 |
| | | | 709/203 |
| 2016/0313906 A1* | 10/2016 | Kilchenko | G06F 3/04847 |
| 2017/0048170 A1* | 2/2017 | Smullen | H04L 67/322 |
| 2017/0289071 A1* | 10/2017 | Roberts | H04L 51/02 |
| 2017/0339088 A1* | 11/2017 | Judd | G06F 9/4843 |
| 2017/0353423 A1* | 12/2017 | Morrison | H04L 51/32 |

(Continued)

*Primary Examiner* — Karen C Tang
(74) *Attorney, Agent, or Firm* — Gowling WLG (Canada) LLP

(57) ABSTRACT

A computing device executing a chatbot application stores primary classification data in a memory; the primary classification data includes records each containing a primary class attribute and corresponding primary response data. The device obtains and stores, from a central repository, a copy of secondary classification data including records each containing a secondary class attribute and corresponding secondary response data. The device receives a message from a client device, and determines whether the message matches any of the primary class attributes. When the message does not match any of the primary class attributes, the device determines whether the message matches any of the secondary class attributes. Based on a match between the message and one of the secondary class attributes, the device selects secondary response data corresponding to the one of the secondary class attributes; and transmits a response to the client device, including the selected secondary response data.

20 Claims, 6 Drawing Sheets

(56) References Cited

U.S. PATENT DOCUMENTS

2018/0013709 A1* 1/2018 Pittner .................... H04W 4/14
2019/0370615 A1* 12/2019 Murphy ............. G06Q 10/0633

* cited by examiner

METHOD, SYSTEM AND APPARATUS FOR CENTRALIZED AUGMENTATION OF AUTONOMOUS MESSAGE HANDLING

CROSS-REFERENCE TO RELATED APPLICATIONS

This application claims priority to U.S. provisional patent application No. 62/425,252, filed Nov. 22, 2016, the contents of which is incorporated herein by reference.

FIELD

The specification relates generally to autonomous message handling applications (e.g. chatbots), and specifically to a method, system and apparatus for augmenting the autonomous message handling functionality of such applications.

BACKGROUND

Chatbots—computing devices configured to autonomously respond to user messages—have grown in popularity in recent years. The capabilities and programmed behaviours of different chatbots vary depending on their intended audience—chatbots intended for entertainment purposes may employ different language processing and response algorithms than those intended to respond to customer service messages or complete Turing Tests. In general, however, chatbots can be configured to recognize various characteristics of messages they receive, and to respond to those messages differently depending on which characteristics were recognized in the received messages.

Typically, the message characteristics that a chatbot is configured to recognize is limited to topics relevant to the operator of the chatbot. Messages received by the chatbot that do not bear any of those characteristics may be simply ignored, or met with a default response. In certain situations, however, ignoring a client message or returning a default response may be undesirable.

BRIEF DESCRIPTIONS OF THE DRAWINGS

Embodiments are described with reference to the following figures, in which.

DETAILED DESCRIPTION OF THE EMBODIMENTS

Figure 1:
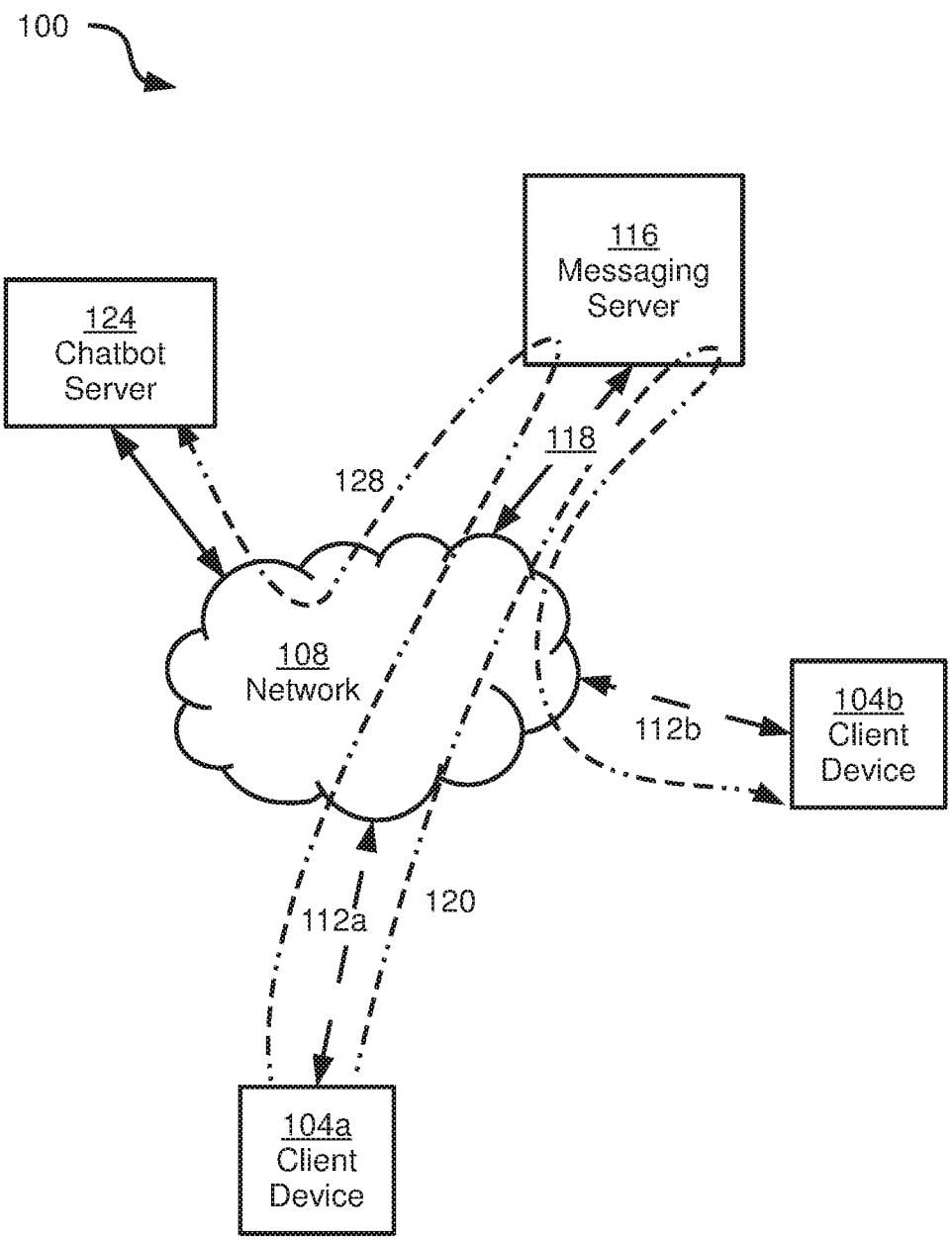
FIG. 1 depicts a communications system, according to a non-limiting embodiment.

FIG. 1 depicts a communications system 100. System 100 includes a plurality of client computing devices, of which two examples 104a and 104b are shown (referred to generically as a client computing device 104 or a client device 104, and collectively as client computing devices 104 or client devices 104). Additional client computing devices (not shown) can be included in system 100. Each client computing device 104 can be any of a cellular phone, a smart phone, a tablet computer, a wearable device such as a smart watch or smart glasses, and the like.

Client computing devices 104a and 104b are connected to a network 108 via respective links 112a and 112b, which are illustrated as wireless links but can also be wired links, or any suitable combination of wired and wireless links. Network 108 can include any suitable combination of wired and wireless networks, including but not limited to a Wide Area Network (WAN) such as the Internet, a Local Area Network (LAN) such as a corporate data network, cell phone networks, WiFi networks and the like.

Via network 108, client computing devices 104 can communicate with a messaging server 116 connected to network 108 via a link 118. Messaging server 116 provides a messaging service to client computing devices 104. For example, client computing device 104a can execute a messaging application for sending and receiving messages to and from messaging server 116. In the embodiments discussed herein, the messages sent and received by devices 104 are instant messages (IM, e.g. Internet Protocol-based messages utilizing a form of the XMPP protocol or the like). In other embodiments, the messages can include any suitable combination of IM, Short Message Service (SMS) messages, Multimedia Messaging Service (MMS) messages and the like.

Messaging server 116 stores routing data including associations between messaging service subscriber identifiers (e.g. account names) and identifiers of client computing devices 104 such as IP addresses, MAC addresses and the like. Messaging server 116 can therefore receive a message from a device 104 (e.g. a message sent from device 104a and addressed to the subscriber identifier associated with device 104b), look up the device identifier of the addressee (e.g. device 104b) based on the subscriber identifier contained in the message, and route the message via network 108 to the addressee (e.g. device 104b), as shown by a message path 120.

Messaging server 116 is also configured to route certain messages to other servers for autonomous handling and response. In the present embodiment, system 100 includes a chatbot server 124. As will be discussed in greater detail below, server 124 is configured to receive messages from client devices 104 (or other chatbot servers, not shown) and autonomously generate response to those messages. Server 124 therefore is assigned a subscriber identifier, and messages addressed to that subscriber identifier are routed by messaging server 116 to server 124, as illustrated in FIG. 1 by message path 128. Having autonomously generated a response to the message, server 124 sends the response to the originating client device 104, via messaging server 116 (e.g. via the reverse of path 128). In some embodiments, as will be seen below, server 124 can be configured to send messages to other entities than the originating client device 104.

Chatbot server 124 may be configured to respond autonomously only to certain types of client messages. For example, if chatbot server 124 is operated by a soft-drink manufacturer, chatbot server 124 may be configured to respond only to client messages generally relevant to soft drinks. Likewise, other chatbot servers are typically configured to respond to specific types of client messages (e.g. only messages encompassing certain topics).

Messaging server 116 and chatbot server 124, as will be described below in greater detail, are configured to interoperate with each other to enable chatbot server 124 (and any of a variety of other chatbot servers) to augment its autonomous message handling capabilities to respond to other types of messages. For example, the above-mentioned interoperation between messaging server 116 and chatbot server 124 may enable chatbot server 124 to respond to messages pertinent to the safety of an operator of a client device 104. Before discussing the functionality of servers 116 and 124 in greater detail, certain components of messaging server 116 and chatbot server 124 will be described with reference to FIG. 2.

Messaging server 116 includes a central processing unit (CPU) 200, also referred to herein as processor 200, interconnected with a memory 204. Memory 204 stores computer readable instructions executable by processor 200, including a routing application 208. Processor 200 and memory 204 are generally comprised of one or more integrated circuits (ICs), and can have a variety of structures, as will now occur to those skilled in the art (for example, more than one CPU can be provided). Memory 204 also stores a routing database 212, which contains messaging account identifiers (the subscriber identifiers mentioned above) and corresponding device identifiers (e.g. IP addresses and the like) to enable server 116 to route messages between client devices 104 and server 124 via the execution of application 208 by processor 200.

More specifically, processor 200 executes the instructions of application 208 to perform, in conjunction with the other components of messaging server 116, the routing functionality discussed above—that is, receiving a message containing a subscriber identifier of a destination for the message, retrieving the device identifier corresponding to the subscriber identifier from routing database 212, and routing the message to the retrieved device identifier.

Memory 204 also stores a secondary classification database 216. Secondary classification database 216 contains at least one set of secondary classification data (also referred to herein as a library) for use by chatbot server 124 and other chatbot servers. That is, database 216 contains commonly accessible classification data for use in augmenting the autonomous message handling capabilities of chatbot servers connected to messaging server 116.

Figure 2:
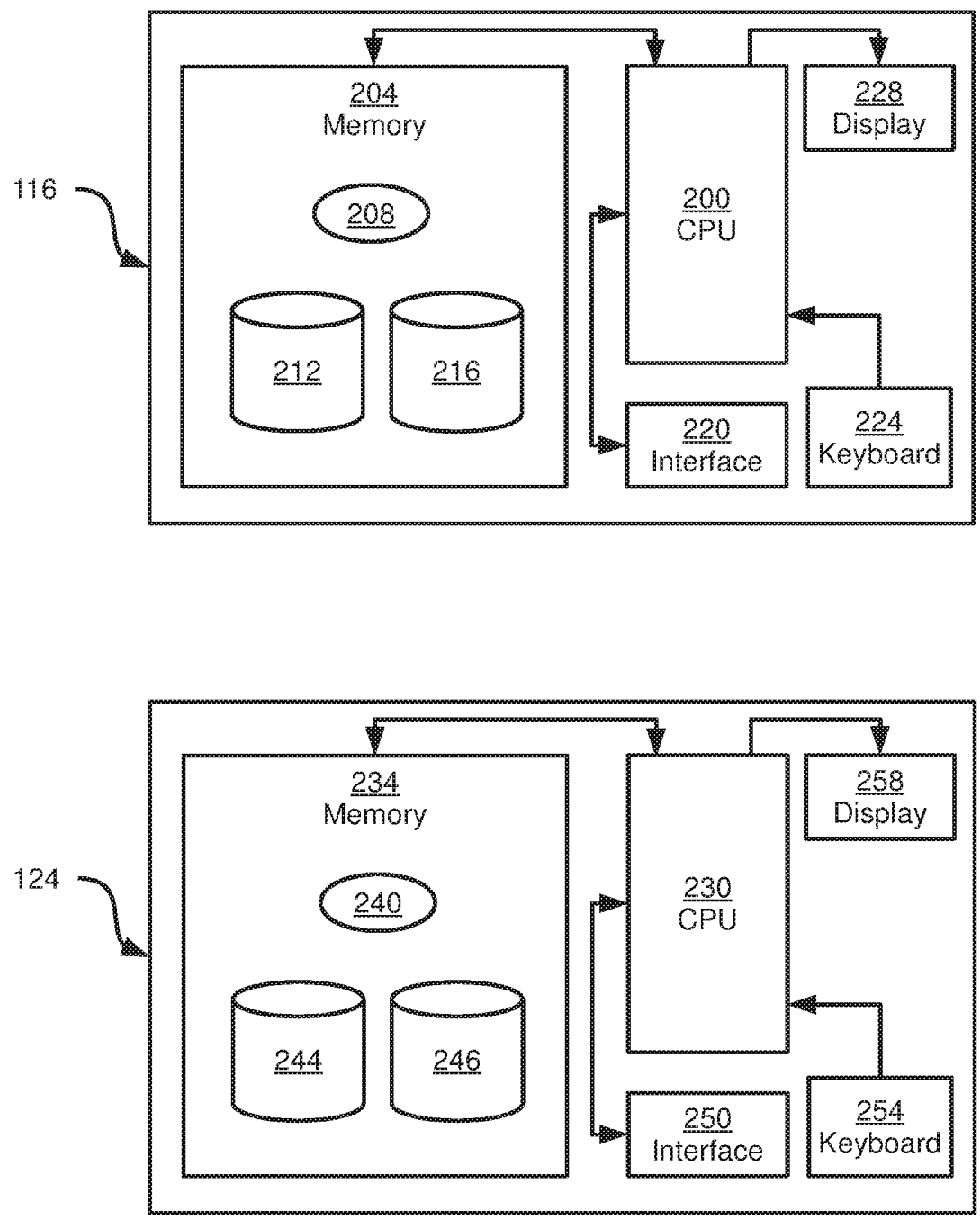
FIG. 2 depicts certain components of the servers of FIG. 1, according to a non-limiting embodiment.

Messaging server 116 also includes a network interface 220 interconnected with processor 200, which allows messaging server 116 to connect to network 108 via link 118. Network interface 220 thus includes the necessary hardware, such as network interface controllers and the like, to communicate over link 118. Messaging server 116 also includes input devices interconnected with processor 200, such as a keyboard 224, as well as output devices interconnected with processor 200, such as a display 228. Other input and output devices (e.g. a mouse, speakers) can also be connected to processor 200. In some embodiments (not shown), keyboard 224 and display 228 can be connected to processor 200 via network 108 and another computing device. In other words, keyboard 224 and display 228 can be local (as shown in FIG. 2) or remote.

Chatbot server 124 includes a central processing unit (CPU) 230, also referred to herein as processor 230, interconnected with a memory 234. Memory 234 stores computer readable instructions executable by processor 230, including a chatbot application 240. Processor 230 and memory 234 are generally comprised of one or more integrated circuits (ICs), and can have a variety of structures, as will now occur to those skilled in the art (for example, more than one CPU can be provided). Processor 230 executes the instructions of application 240 to perform, in conjunction with the other components of chatbot server 124, various functions related to receiving and responding to messages from client computing devices 104. In the discussion below of those functions, chatbot server 124 is said to be configured to perform those functions—it will be understood that chatbot server 124 is so configured via the processing of the instructions in application 240 by the hardware components of chatbot server 124 (including processor 230 and memory 234).

Memory 234 also stores a primary classification database 244, which contains data employed by server 124 during the execution of application 240 to respond autonomously to messages from client devices 104. Database 244, in general, contains records each including one or more primary classification attributes and one or more items of response data. Each record defines a message class (e.g. a topic). Incoming client messages are assigned to a class based on a comparison between the message and the primary classification attributes, to determine which primary classification attributes most closely match the incoming message. Response data is selected from the record of the most closely matching classification attributes.

Memory 234 also stores a secondary classification database 246. Database 246 contains secondary classification data employed by server 124 during the execution of application 240 to classify and respond to client messages. However, in contrast with primary classification database 244, secondary classification database 246 is employed to respond to client messages containing data not readily classified using primary classification database 244 (that is, messages having topics that chatbot server 124 is not otherwise configured to respond to). Further, as will be seen below, secondary classification database 246 is not particular to chatbot server 124. Instead, secondary classification database 246 contains a subset of the central database 216 stored by messaging server 116.

Chatbot server 124 also includes a network interface 250 interconnected with processor 230, which allows chatbot server 124 to connect to network 108. Network interface 250 thus includes the necessary hardware, such as network interface controllers and the like, to communicate over network 108. Chatbot server 124 also includes input devices interconnected with processor 230, such as a keyboard 254, as well as output devices interconnected with processor 230, such as a display 258. Other input and output devices (e.g. a mouse, speakers) can also be connected to processor 230. In some embodiments (not shown), keyboard 254 and display 258 can be connected to processor 230 via network 108 and another computing device. In other words, keyboard 254 and display 258 can be local (as shown in FIG. 2) or remote.

Figure 3:
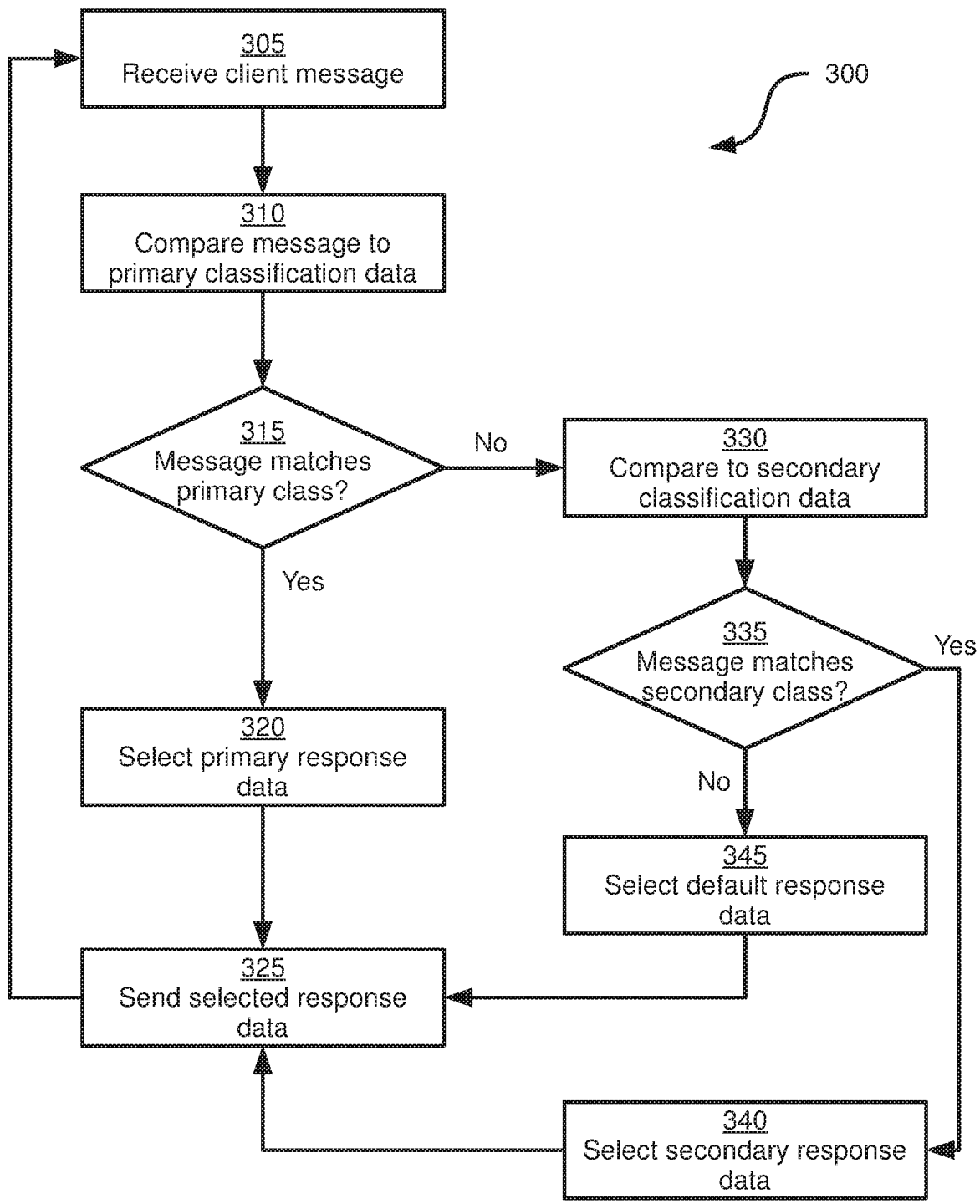
FIG. 3 depicts a method of autonomous message handling at the chatbot server of FIG. 1, according to a non-limiting embodiment.

Having described certain internal components of servers 116 and 124, the actions performed by servers 116 and (in particular) 124 will be discussed in greater detail. Referring now to FIG. 3, a method 300 of autonomous message handling is illustrated. Method 300 will be described below in connection with its performance in system 100. Specifically, the blocks of method 300 are performed by chatbot server 124, via the execution of application 240 by processor 230.

At block 305, server 124 is configured to receive a message sent by a client device 104, such as (in the present example) client device 104a, and addressed to server 124 (that is, to the subscriber identifier assigned to chatbot server 124). More specifically, via the execution of application 208, server 116 receives the message, retrieves the network address of the addressee from database 242, and forwards the message to that network address, resulting in receipt of the message at chatbot server 124.

At block 310, server 124 is configured to compare the received message to the primary classification data stored in database 244. In general, the performance of block 310 serves to classify the received message—that is, to determine which of the classes defined by the primary classification data best corresponds to the received message. As an illustrative example, the message received at block 305 is the string "Hi!", and the contents of database 244 is as shown below in Table 1 (though as will be apparent to those skilled in the art, database 244 need not be structured in the same format as Table 1). In the present example, chatbot server 124 is operated by an entity making and/or selling clothing, and is therefore configured to interact with client devices to provide client devices information about the clothing offered by the entity.

TABLE 1

Primary Classification Data

| Class ID | Attributes | Response Data |
| --- | --- | --- |
| Greeting | hi<br>hello<br>hey | "Hi, what can I help you with?"<br>"Hi, how can I help?" |
| Tops | shirt<br>top<br>sweater | "Sure, I'll show you some shirts; what's your favourite colour?" |
| Bottoms | leg<br>pant<br>bottom | "Are you looking for shorts or pants?" |

As seen in Table 1, the primary classification data defines three message classes, as well as at least one item of response data (two for the first record) for each class. Each class is defined by a record (a row in the above table, though various other record structures may also be employed) containing an identifier of the class, a set of attributes defining the class, and the above-mentioned response data. In the present example, the class attributes are simply keywords to be compared to the received message. In other embodiments, the class attributes can be more complex, including output parameters from topic detection algorithms or the like.

The primary classification data can take a variety of other forms. For example, although each class is defined above by a plurality of keywords, in other embodiments, each class can have a single keyword. Further, although the response data shown in Table 1 includes only strings of text, in other embodiments the response data can also include commands causing server 124 to retrieve other data (e.g. images, videos and the like) from memory 234 for inclusion in a response message. In addition, the response data may include commands for server 124 to select text strings from other databases for inclusion in the response message, such as from an inventory database of the above-mentioned clothing provider.

At block 310, therefore, in the present example server 124 is configured to compare the received message, "Hi!", to the contents of Table 1. Specifically, the message is compared to the class attributes. At block 315, server 124 is configured to determine whether the received message matches any of the primary classes. In the present example, the determination at block 315 is whether the received message contains any of the keywords in the class attributes fields of Table 1. As will now be apparent, the determination at block 315 in this example is affirmative, as the received message matches one of the keywords in the "Greeting" class.

The performance of method 300 therefore proceeds to block 320, at which server 124 is configured to select primary response data corresponding to the class attributes matching the received message. In the present example, server 124 is configured to select one of the two preconfigured response strings corresponding to the Greeting class at random. A wide variety of other selection mechanisms can also be implemented (e.g. based on demographic or other profile data associated with the originating client device, when such data is available). At block 325, server 124 is configured to transmit a response to the client device (routed via server 116) that sent the message received at block 305. The response includes the response data selected at block 320. Following transmission of the response message at block 325, server 124 awaits a further message at block 305.

As will now be apparent, certain messages received by server 124 may not match any of the class attributes stored in database 244. For example, a further message may be received from client device 104*a* containing the string, "Help, I've been robbed". As seen from Table 1, the comparison and determination at blocks 310 and 315 will reveal that the primary classification data in database 244 does not contain any attributes matching the message, and therefore also does not contain any response data for such a message. Typically, chatbots receiving messages that they cannot classify return a default response message or no response message. Server 124, however, proceeds to block 330 of method 300.

At block 330, server 124 is configured to compare the received message to the secondary classification data stored in database 246 (that is, the classification data corresponding to a subset of the central classification database 216). The performance of block 330 serves to classify the received message according to a different set of classification attributes than those employed at block 310. An example of secondary classification data is shown below in Table 2:

TABLE 2

Secondary Classification Data

| Class ID | Attributes | Response Data |
| --- | --- | --- |
| Emergency | help<br>accident | "You should call [emerg. number] for help" |
| Mental Health | depress<br>suicide | "You may like talking to these guys: [contact]" |

Similarly to Table 1, Table 2 contains a class identifier for each secondary message class, as well as attributes to be matched to messages in that class, and response data for messages in that class. Thus, at block 330 server 124 is configured to compare the message received at block 305 to the secondary class attributes, and at block 335 server 124 is configured to determine whether the received message matches any of the secondary classes (based on a match between the message and the class attributes).

In the present example, the message, "Help, I've been robbed" matches an attribute of the "Emergency" class, and the determination at block 335 is therefore affirmative. When the determination is negative, server 124 proceeds to block 345 and selects a default response (which may also be no response) from either of the primary and secondary classification data.

Following an affirmative determination at block 335, server 124 is configured, at block 340, to select secondary response data corresponding to the class attribute(s) matching the received message. In the present example, therefore, at block 340 server 124 selects the item of response data shown in the first record of Table 2. The response data includes a dynamically generated field "[emerg. number]". Server 124 is configured, in response to detecting such a field, to retrieve a telephone number for emergency services from a database of such numbers, for example based on the location of client device 104a. Thus, for client devices located in North America, the response data selected at block 340 is "You should call 911 for help". At block 325, server 124 is configured to send a response message containing the response data selected at block 340.

A variety of other types of response data are also contemplated. For example, in addition to data such as an emergency services number (or physical location), the secondary response data can include contact information for other chatbot servers or human-operated accounts (not shown) in system 100. As shown in Table 2, the second record includes a text string and a field into which server 124 is configured to insert a subscriber identifier corresponding to another client of messaging server 116 (e.g. another client device, or a server that routes incoming messages to a plurality of operator computing devices). The receipt of the subscriber identifier by the client device enables the client device to initiate communications (via server 116) with the identified subscriber.

Other types of secondary response data are also contemplated. For example, rather than including contact data selectable by the client device 104 as discussed above, server 124 can be configured to select response data for directing the response sent at block 325 to both the originating client device 104 and another subscriber. In other words, server 124 can select response data that proactively establishes contact between the client device 104 and another device. For example, the selected response data can include a "mention" data element as described in Applicant's US co-pending application No. 62/317,821, entitled "System, Apparatus And Method For Autonomous Messaging Integration", filed on Apr. 4, 2016.

Secondary response data may also include response data that is not delivered to client device 104, but rather to other subscribers within the messaging service or to computing devices outside the messaging service. For example, certain secondary class identifiers may correspond to message topics indicative of potential criminal activity (e.g. distribution of illicit material, human trafficking and the like). Response data corresponding to such class identifiers may include instructions to server 124 to send messages to computing devices operated by law enforcement, rather than (or in addition to) responding to client device 104.

In further embodiments, the secondary classification data can include an ordered set of responses for a given class, that are selected as a set at block 340 (rather than selecting a single item of response data). That is, server 124 can be configured to select a set of response data items that correspond to the class attribute matched with an incoming message. Typically, each member of the set of response data items also includes suggested responses that are selectable by the client device 104. Responsive to selecting the set of response data items, server 124 is configured to bypass the classification blocks of method 300 for further messages from the client device 104 until every member of the set of response data items has been sent. Thus, server 124 is configured to send the first member of the set, receive a selection of one of the suggested responses, and repeat that procedure until all members of the set have been sent and the responses from the client device 104 have been stored.

The above mechanism of selecting a set of response data items at block 340 and iterating through each member of the set before resuming per-message classification (i.e. before resuming the performance of blocks 310-320 and 330-340) permits server 124 to perform a risk assessment. For example, each response from the client device 104 to the set of response data items can be a numerical value, or can be translated to a numerical value at server 124 (e.g. by semantic analysis). The sum of those values when responses for every message in the set have been received from the client device 104 (e.g. a risk assessment score) can be employed to select further response data at server 124. For example, server 124 can be configured, for a high level of assessed risk, to select response data indicating an emergency services number. For a low level of assessed risk, on the other hand, server 124 can select response data including a subscriber identifier corresponding to another messaging account. Any suitable set of score thresholds and corresponding response data (e.g. different subscriber identifiers) can be stored in the secondary classification data.

In other embodiments, the above-mentioned scoring (or indeed, any response messages to client device 104) can be performed by a distinct computing device, such as another chatbot server (not shown). In such embodiments, the secondary classification data stored by chatbot server 124 is as shown below in Table 3. Similarly to the secondary classification data of Table 2, the classification data of Table 3 includes the class identifiers and attributes shown above. However, the response data corresponding to the "mental health" secondary class has been replaced with a response string that incorporates an instruction to server 124 to proactively call a mental health risk assessment chatbot (e.g. implemented by another server, not shown in FIG. 1). More specifically, in this embodiment the response data includes a "mention" instruction, causing server 124 to include a "mention" tag (indicated below by the "@" symbol) that includes the subscriber identifier of the risk assessment chatbot. As set out in Applicant's co-pending application No. 62/317,821, server 116 is configured, responsive to receiving a message containing such a tag, to route the message not only to the addressee (a client device 104, in this example), but also to the subscriber identified in the "mention" tag.

TABLE 3

Secondary Classification Data

| Class ID | Attributes | Response Data |
|---|---|---|
| Emergency | help<br>accident | "You should call [emerg. number] for help" |
| Mental Health | depress<br>suicide | "You may find @[contact] helpful" |

Figure 4:
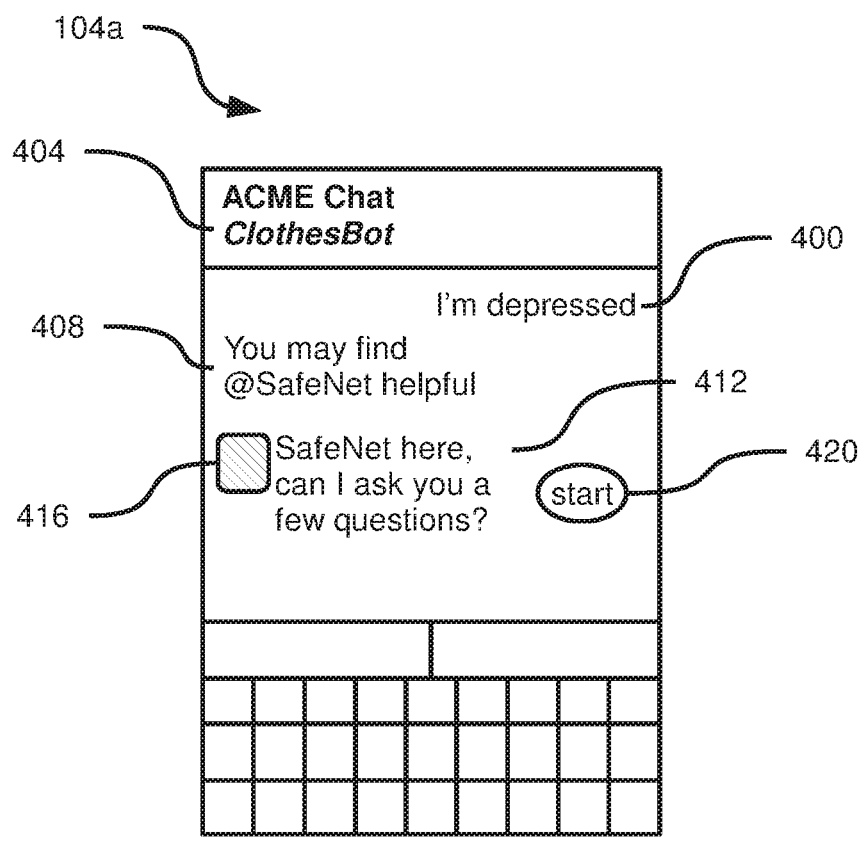
FIG. 4 depicts a messaging interface presented by a client device of FIG. 1 during the performance of the method of FIG. 3, according to another embodiment.
Figure 5:
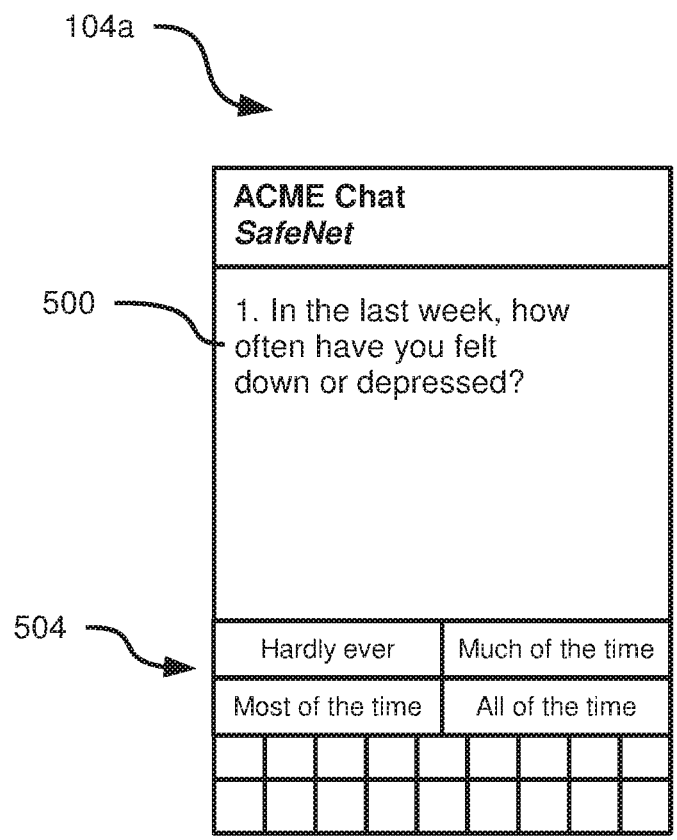
FIG. 5 depicts a further messaging interface presented by a client device of FIG. 1 during the performance of the method of FIG. 3, according to another embodiment.

Therefore, in response to a message from a client device 104 that matches the "mental health" secondary class, server 124 is configured to transmit a response to the client device 104 as shown in FIG. 5. More particularly, FIG. 4 depicts a messaging interface presented on the display of client device 104a, in which a message 400 has previously been transmitted by client device 104a to server 124 (which has the subscriber identifier 404 "ClothesBot"), The response from server 124 is, as set out by Table 3, a message 408 that includes the string "@SafeNet", which causes server 116 to route the message not only to client device 104a, but also to the account "SafeNet", which corresponds to another chatbot server connected to network 108.

Following receipt of the above-mentioned message, the SafeNet chatbot itself is configured to send a reply to server 124, which is also routed to client device 104a. As seen in FIG. 4, the reply 412 includes a graphical indicator 416 to visually identify reply 412 as being from a different source than the other messages on the left side of the conversation window. Upon receiving the message from the other chatbot, client device 104a is configured to present, on the display thereof, a reply element 420 that is selectable to, for example, cause client device 104a to transmit a response to both ClothesBot (that is, server 124) and the other chatbot containing the string "start" to indicate willingness to begin a risk assessment questionnaire. In other embodiments, selection of element 420 may cause client device 420 to initiate a messaging conversation with the SafeNet chatbot (i.e. without ClothesBot).

When client device 104a has initiated communications with the SafeNet bot, the SafeNet bot is configured to retrieve from memory and begin sending to client device 104a an ordered sequence of queries as shown below in Table 4.

TABLE 4

Response Data at SafeNet Chatbot

| Question | Responses | Scores |
|---|---|---|
| 1. In the last week, how often have you felt down or depressed? | Hardly ever; Much of the time; Most of the time; All of the time | 1; 2; 3; 4 |
| 2. In the last week, how often have you felt worthless or hopeless? | Hardly ever; Much of the time; Most of the time; All of the time | 1; 2; 3; 4 |
| ... | ... | ... |

More specifically, the SafeNet bot is configured to retrieve and send the first question (i.e. the contents of the "question" field in the first record of Table 4) as well as the corresponding set of selectable responses. FIG. 5 depicts the display of client device 104a following the receipt of the first question. As seen in FIG. 5, the message 500 is displayed in a conversation window, and selectable responses 504 corresponding to those in the first record of Table 4 are presented for selection. The chatbot server is configured, upon receipt of a selection of one of the predefined responses from client device 104a, to select the corresponding score from the "Scores" field of Table 4 (e.g. 3 for the response "most of the time"), and transmit the next question. For each response received from client device 104a, the score maintained at the chatbot server is updated.

When the sequence of questions has been traversed in full, the chatbot server is configured, based on the final score obtained, to select further response data. For example, a score that exceeds a predefined upper threshold may result in the chatbot server suggesting that the user of client device 104a contact emergency services (or contacting such services immediately on behalf of the user). For example, the chatbot server can be configured to transmit a contact link that is selectable at the client device to initiate communications with a further chatbot, such as a chatbot operated by the Crisis Text Line.

As a further example, a score that is below a predefined lower threshold (indicating a lower level of risk) can result in the chatbot server suggesting a contact to client device 104a, as in the second record of Table 3 above. For example, the chatbot server can transmit a contact link that is selectable at the client device to initiate communications with a further chatbot, such as a chatbot operated by a counseling service such as Koko. Any number of intermediate thresholds with other resulting actions may also be implemented at the chatbot server.

The example questions shown in Table 4 are modeled after the 6-item Kutcher Adolescent Depression Scale (KADS). A wide variety of other questionnaires can also be implemented, to assess other mental-health related risks, or distinct types of risk.

Thus, the secondary classification data stored in database 246 permits server 124 to respond to messages that it is not configured to respond to by primary classification data alone, thus reducing the configuration burden on the operators of server 124. The secondary classification data may be maintained solely at server 116, and server 124 (and any other chatbot server) can obtain any updates to the secondary classification data periodically.

Figure 6:
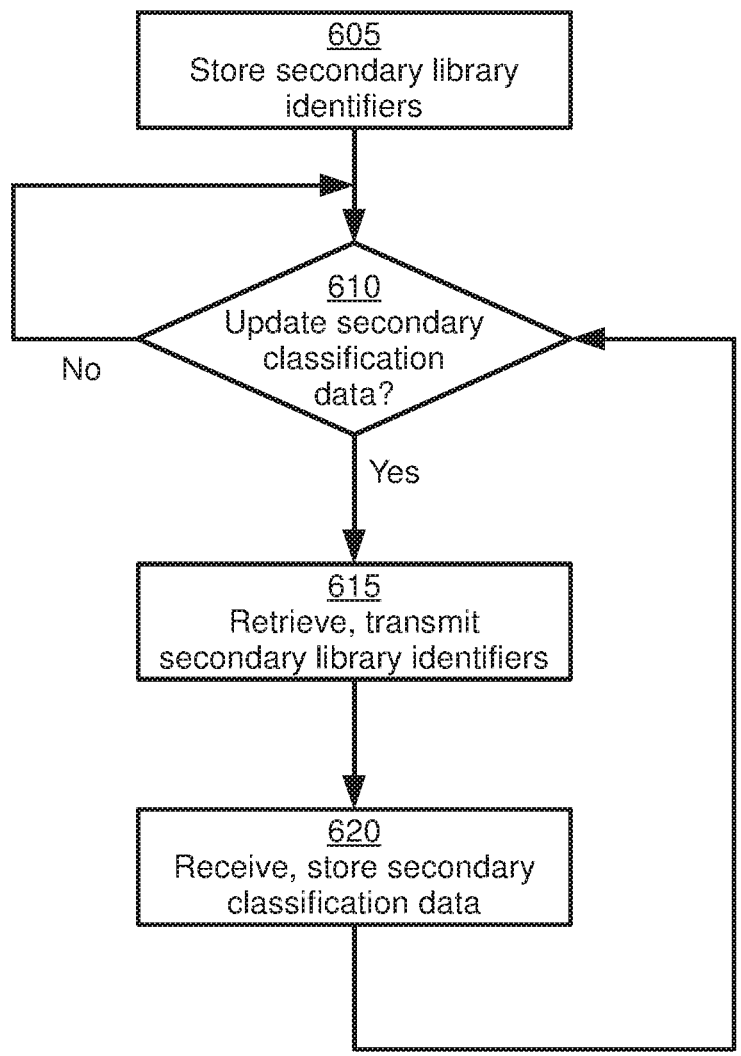
FIG. 6 depicts a method of updating secondary classification data at the chatbot server of FIG. 1, according to a non-limiting embodiment.

Turning to FIG. 6, a method 600 of updating secondary classification data is illustrated. The blocks of method 600 are performed by chatbot server 124, via the execution of application 240.

At block 605, server 124 is configured to store secondary library identifiers in memory 234. The secondary library identifiers each identify a subset of the contents of database 216 at server 116. More specifically, each secondary library identifier corresponds to a portion of the secondary classification data in database 216. An example of secondary library identifiers as stored in memory 234 is shown below in Table 5.

TABLE 5

Secondary Library Identifiers

| Library ID | Update Criteria |
|---|---|
| Safety | Weekly |

As seen above, Table 5 includes the secondary library identifier "safety". Table 5 also includes an update criteria, in the present example specifying a frequency with which server 124 is configured to seek updates. However, in other embodiments, the update criteria can be omitted, as will be apparent in the discussion below.

At block 610, server 124 is configured to determine whether to update the secondary classification data of database 246. The determination at block 610 can be performed in a variety of ways. For example, server 124 can be configured to store a timestamp indicating the most recent update (for example, in an additional field of Table 5), and to determine whether the update criteria shown above is satisfied based on that timestamp. In other examples, server 124 can receive a notification from server 116 indicating that updated secondary classification data is available. In further embodiments, the determination at block 610 can be a determination of whether an operator command to initiate an update has been received (e.g. via keyboard 254).

As will be apparent, the determination at block 610 can be made independently for each stored secondary library identifier (e.g. when each identifier is stored in connection with a distinct update criterion, or for the entire store set of secondary library identifiers.

When the determination at block 610 is affirmative, server 124 proceeds to block 615. At block 615, server 124 retrieves the secondary library identifiers stored in memory 124 and transmits one or more update requests to server 116. For example, a single message can be transmitted to server 116 containing all the retrieved secondary library identifiers, or a plurality of messages each containing a single identifier can be sent to server 116. Such update request messages can be transmitted according to a preconfigured application programming interface (API) exposed by server 116.

Server 116 is configured, upon receipt of the above-mentioned messages, to retrieve from database 216 the secondary classification data corresponding to the received library identifiers, and send the retrieved data to server 124. Table 6 illustrates an example of database 216.

TABLE 6

Secondary Classification Database

| Library ID | Class ID | Attributes | Response Data |
|---|---|---|---|
| Safety | Emergency | help accident | "You should call [emerg. number] for help" |
|  | Mental Health | depress suicide | "You may like talking to these guys: [contact]" |
| ... | ... | ... | ... |

As seen above, database 216 contains a plurality of records each identified by a secondary library identifier, and containing one or more sub-records defining secondary classification data. In some embodiments, rather than employ library identifiers that are distinct from secondary class identifiers, the secondary class identifiers themselves can be employed to request and deliver updates.

At block 620, server 124 is configured to receive the updated secondary classification data from server 116 and update the contents of database 246 to include the updated data. Performance of method 600 then returns to block 610 to await a further update. The secondary library identifiers stored at server 124 can also be updated. For example, in response to operator input, server 124 can transmit a request to server 116 for all available secondary library identifiers. Having received the available identifiers, server 124 can store a list of all available secondary library identifiers, and certain ones as active (i.e. those to update via the performance of method 600).

As will now be apparent, through the retrieval and updating of secondary classification data from server 216, server 124 is configured to extend the scope of its message handling functionality. Further, such extension of functionality can readily be obtained by a wide variety of other chatbot servers, while requiring only a central set of secondary classification data to be maintained. Although the secondary classification data discussed above enables chatbot server 124 to respond to safety-related client messages, various other secondary libraries can also be implemented, such as an encyclopedia.

The scope of the claims should not be limited by the embodiments set forth in the above examples, but should be given the broadest interpretation consistent with the description as a whole.

The invention claimed is:

1. A method in a computing device executing a chatbot application, comprising:
   storing primary classification data in a memory, the primary classification data including a plurality of records each containing a primary class attribute and corresponding primary response data, wherein the primary classification data is unrelated to a respective primary classification data of at least one other chatbot;
   storing secondary classification data in the memory, the secondary classification data including a plurality of records each containing a secondary class attribute and corresponding secondary response data, wherein the secondary classification data is situational data and unrelated to the primary classification data and wherein the secondary classification data is accessible to the at least one other chatbot application;
   receiving a message from a client device via a network and determining client characteristics based on the message;
   determining whether the message matches any of the primary class attributes;
   determining whether the message matches any of the secondary class attributes independently of a determination of the secondary class attribute similarity to a respective message received by the at least one other chatbot, the secondary class attributes accessible to the chatbot and the at least one other chatbot, wherein the secondary class attribute is a situational attribute;
   based on a match between the message and one of the secondary class attributes, selecting secondary response data corresponding to the one of the secondary class attributes;
   based on the selected secondary response data, generating further response data based on the determined client characteristics; and
   transmitting a response to the client device, including the selected secondary response data.

2. The method of claim 1, further comprising: determining whether the message matches any of the secondary class attributes responsive to determining that the message does not match any of the primary class attributes.

3. The method of claim 1, further comprising: determining whether the message matches any of the primary class attributes responsive to determining that the message does not match any of the secondary class attributes.

4. The method of claim 1, further comprising:
   responsive to determining that the message does not match any of the primary class attributes or any of the secondary class attributes, selecting default response data.

5. The method of claim 1, wherein the secondary response data includes an identifier of a further computing device executing a further chatbot application.

6. The method of claim 5, wherein the secondary response data includes an integration element containing the identifier, for causing a routing server to direct the response to the client device and to the further computing device.

7. The method of claim 1, wherein the memory comprises a central repository and selecting secondary response data comprises:
   storing a library identifier corresponding to the secondary classification data;
   transmitting the library identifier to the central repository; and
   responsive to transmitting the library identifier, receiving the secondary response data from the central repository.

8. The method of claim 7, further comprising:
   prior to transmitting the library identifier, determining whether to update the secondary classification data.

9. The method of claim 8, wherein the determination includes receiving a notification from the central repository that updated secondary classification data is available.

10. The method of claim 7, further comprising:
storing a plurality of library identifiers each corresponding to distinct sets of secondary classification data; and
transmitting each of the library identifiers to the central repository.

11. A computing device, comprising:
a memory storing primary classification data, the primary classification data including a plurality of records each containing a primary class attribute and corresponding primary response data, wherein the primary classification data is unrelated to a respective primary classification data of at least one other computing device;
a processor interconnected with the memory, the processor configured to:
obtain secondary classification data from the memory, the secondary classification data including a plurality of records each containing a secondary class attribute and corresponding secondary response data, wherein the secondary classification data is situational data and unrelated to the primary classification data and wherein the secondary classification data is accessible to at least one other computing device;
receive a message from a client device via a network, and determine client characteristics based on the message;
determine whether the message matches any of the primary class attributes
determine whether the message matches any of the secondary class attributes independently of a determination of primary class attribute similarity to a respective message received by the at least one other computing device, the secondary class attributes accessible to the chatbot and the at least one other chatbot, wherein the secondary class attribute is a situational attribute;
based on a match between the message and one of the secondary class attributes, select secondary response data corresponding to the one of the secondary class attributes;
based on the selected secondary response data, generating further response data based on the determined client characteristics; and
transmit a response to the client device, including the selected secondary response data.

12. The computing device of claim 11, the processor further configured to determine whether the message matches any of the secondary class attributes responsive to determining that the message does not match any of the primary class attributes.

13. The computing device of claim 11, the processor further configured to determine whether the message matches any of the primary class attributes responsive to determining that the message does not match any of the secondary class attributes.

14. The computing device of claim 11, the processor further configured to:
responsive to determining that the message does not match any of the primary class attributes or any of the secondary class attributes, select default response data.

15. The computing device of claim 11, wherein the secondary response data includes an identifier of a further computing device executing a further chatbot application.

16. The computing device of claim 15, wherein the secondary response data includes an integration element containing the identifier, for causing a routing server to direct the response to the client device and to the further computing device.

17. The computing device of claim 11, the processor configured to obtain the secondary classification data by:
storing a library identifier corresponding to the secondary classification data in the memory;
transmitting the library identifier to the central repository; and
responsive to transmitting the library identifier, receiving the secondary classification data from the central repository.

18. The computing device of claim 17, the processor further configured to:
prior to transmitting the library identifier, determine whether to update the secondary classification data.

19. The computing device of claim 18, wherein the determination includes receiving a notification from the central repository that updated secondary classification data is available.

20. The computing device of claim 17, the processor further configured to:
store a plurality of library identifiers each corresponding to distinct sets of secondary classification data; and
transmit each of the library identifiers to the central repository.

* * * * *